Sept. 12, 1933.  C. A. BECKETT  1,926,135
MACHINE FOR GRAINING LITHOGRAPHIC PLATES
Filed April 7, 1933  2 Sheets-Sheet 1

Inventor
CHARLES ARTHUR BECKETT,
BY
Attorneys

Sept. 12, 1933.　　　　　C. A. BECKETT　　　　　1,926,135
MACHINE FOR GRAINING LITHOGRAPHIC PLATES
Filed April 7, 1933　　　　2 Sheets-Sheet 2
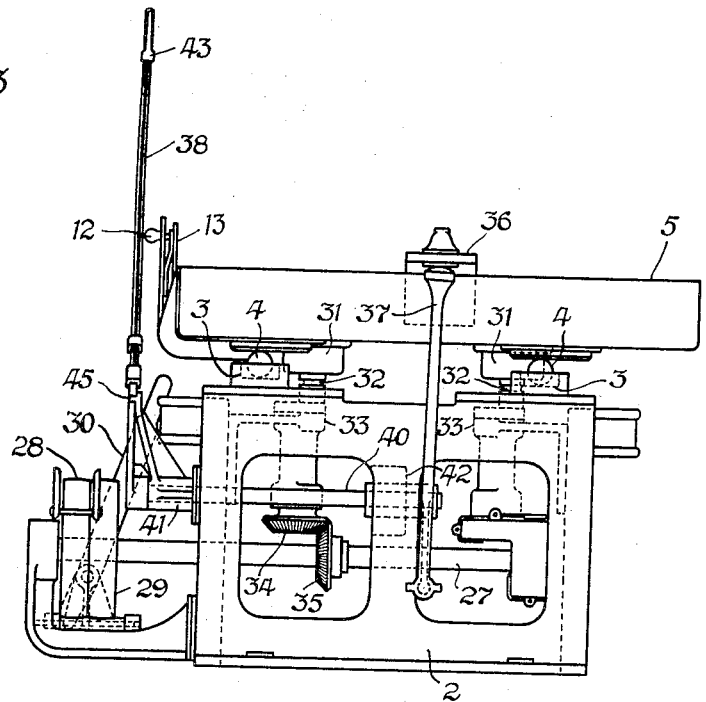
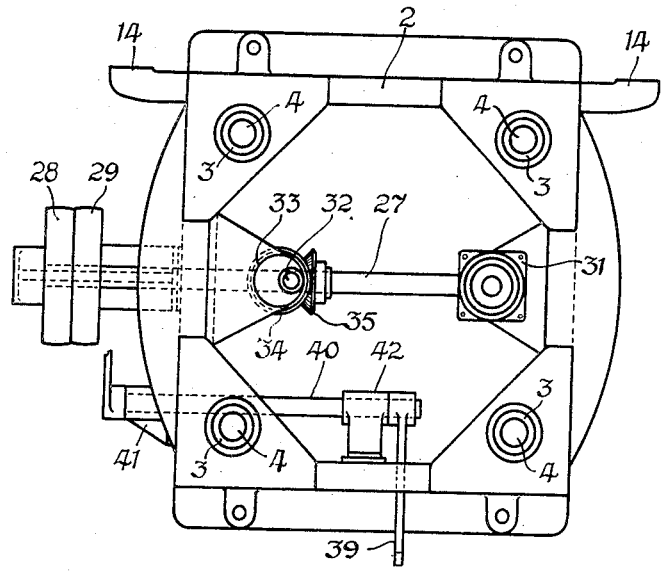
Inventor
CHARLES ARTHUR BECKETT,
BY
Attorneys Patented Sept. 12, 1933

1,926,135

UNITED STATES PATENT OFFICE 1,926,135

MACHINE FOR GRAINING LITHOGRAPHIC PLATES

Charles Arthur Beckett, Hull, England

Application April 7, 1933, Serial No. 664,959, and in Canada April 23, 1932

6 Claims. (Cl. 51—6)

This invention relates to machines for graining lithographic plates of the kind wherein the plates are subjected to the action of rolling or spinning spherical bodies working in water with gritty substances within a gyrating trough and wherein the spherical bodies are caused to leave the plates, when grained, under the action of gravity whilst operatively acting thereon through the medium of a tiltable false bottom to the trough capable of being tilted whilst the machine is in motion, a suitable container receiving the spherical bodies on discharge from the trough, said container being adapted to permit the bodies to be washed and to be tiltable so as to be capable of manipulation for returning said bodies into the trough for the next operation.

In such type of graining machine as hitherto constructed, the container for the spherical bodies is tilted by hand and is so mounted that it is attached to and carried by the trough and must of necessity gyrate therewith, consequently there is an uneven distribution of weight especially when the spherical bodies are accumulating in the container on discharge from the trough. Furthermore, it would be much more convenient to have the container for the spherical bodies separately mounted from the trough so as to be stationary instead of gyrating with the trough.

Again as the container has to be tilted by hand there is a considerable weight of spherical bodies to be moved where large machines are used and it is not an easy operation to lift the container when full.

According to this invention, therefore, in a machine for graining lithographic plates, the container for receiving the spherical bodies is mounted extraneously of the trough and separately therefrom, means being provided for mechanically moving the container bodily towards the trough into a tipping position with respect thereto for depositing the spherical bodies into the trough.

Means may also be provided on the container for directing the spherical bodies into the trough on discharge from the container and for receiving and directing them back again into the container on return from the trough, which means may also serve to retain the bodies in the container until such time as said container reaches the requisite tipping position for discharging the bodies and to be operable by gravitational movement of the bodies for releasing them for discharge from the container.

There may also be provided on the false bottom means for directing the spherical bodies into the container on return from the trough and said means may comprise a movable closure to the trough.

Referring to the drawings filed herewith:—

Fig. 3 is a rear elevation; and

Fig. 4 is a plan of same with the trough removed.

Figure 1:
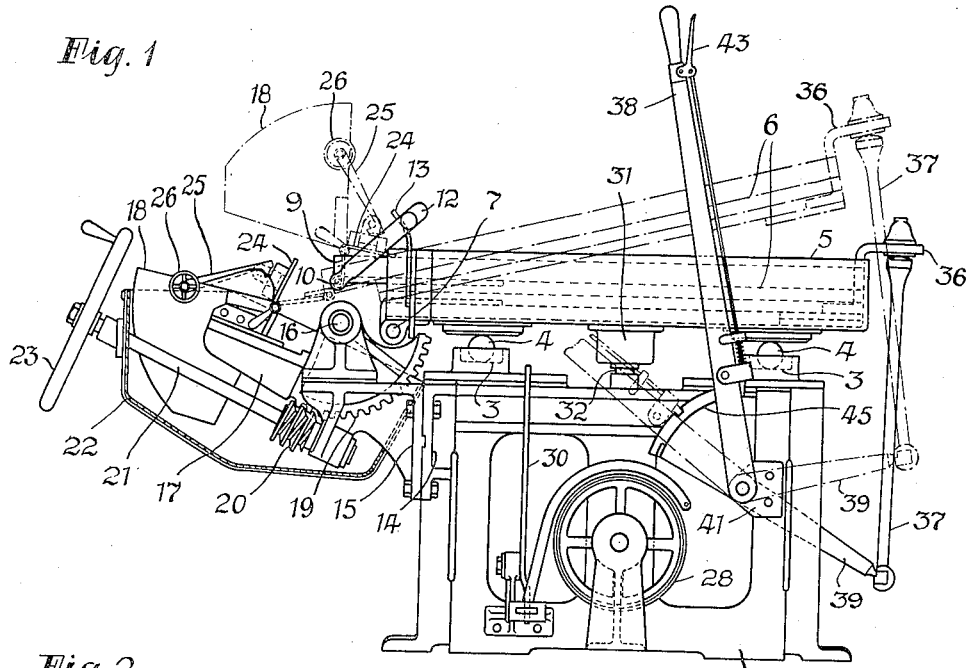
Fig. 1 is a side elevation of one form of machine made in accordance with this invention.
Figure 2:
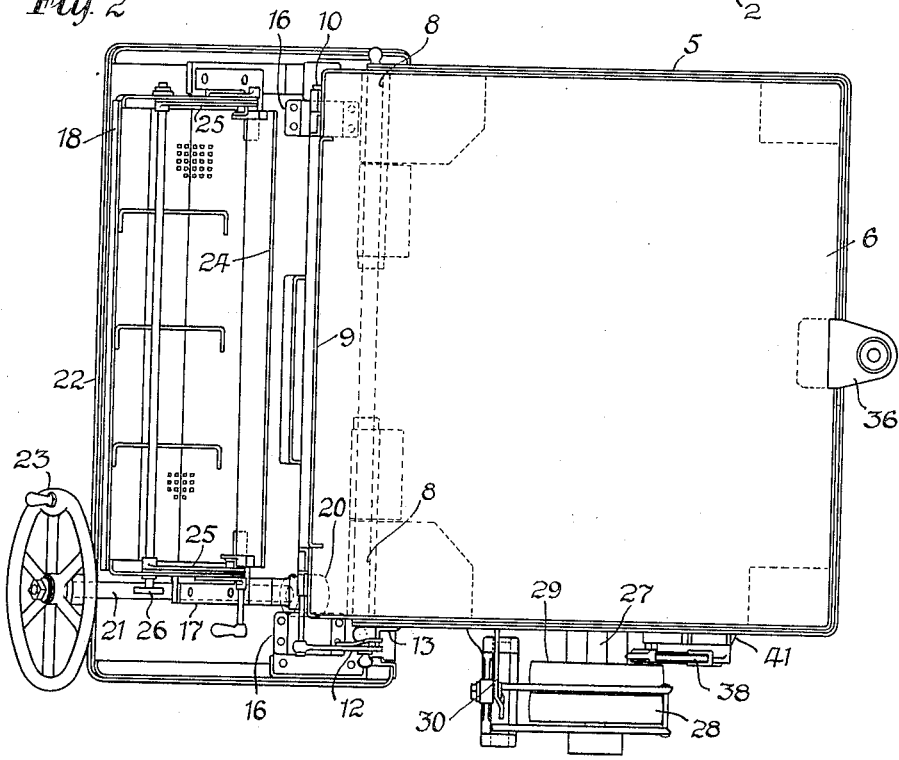
Fig. 2 is a plan.

2 is a standard or framing having at each of its four corners a cup 3 with a loose ball 4 therein. Resting on the balls 4 is a rectangular trough 5 having a false bottom 6 hinged at 7 to two co-axial cross bars 8 carried by the trough so as to be capable of being raised at its free end as indicated in broken lines in Fig. 1.

The trough 5 at the front is closed by a drop front plate 9 which is hinged at 10 to the front of the false bottom 6 and movable by a hand lever 12 which also locks the front plate 9 in the closed position by co-operating with a catch 13 disposed on the side of the trough 5.

Attached to each of two integral lugs 14 at two opposite sides of the framing 2 near the front thereof is a bracket 15 on which is mounted a pedestal 16 for a swing mounting 17 carrying the container 18 for the spherical bodies extraneously and separately of the trough 5 at the front thereof. This swing mounting 17 has an integral or attached toothed segment 19 in engagement with the worm 20 of a spindle 21 which is mounted at its fast end in the adjacent bracket 15 and at its free end in a well 22 for the container 18, the spindle 21 being provided with a hand operating wheel 23. Manipulation of the hand wheel 23 actuates the segment 19 so as to swing the container 18 from its normal position into the position shown in chain lines (Fig. 1), that is, tilted towards the false bottom 6 for returning the spherical bodies into the trough.

Hinged to the mouth of the container 18 at the trough side thereof is a movable flap 24 which normally lies across the said mouth so that when the container is being tilted, it serves to prevent the spherical bodies leaving the container too soon and until such time as it is convenient for them to do so, whereupon the accumulation of the bodies near the flap caused by their natural movement under the action of gravity automatically opens the flap to the position shown in full lines (Fig. 1) in which position the flap is engaged by hooks 25 and constitutes a guiding platform for directing the spherical bodies properly into the trough. These hooks 25 are mounted on the container 18 and provided with a small manipulating handwheel 26 by which they can be disengaged from the flap 24 to allow it to fall backwards into the position shown in dotted lines (Fig. 1) to form a receiving platform for the spherical bodies when they are being returned from the trough by the tilted false bottom 6. The drop front plate 9 on the trough is also adapted to be let down by manipulation of the lever 12 when the false bottom is tilted in order to direct the spherical bodies therefrom into the container 18.

Where desired, the well 22 instead of being carried on the standard 2, as is the case in the example illustrated, may be a loose unit on wheels and provided with an outlet for the overflow of water so that residual settlings can be taken out. The container 18 is perforated.

Supported in the base of the framing 2 is a driving shaft 27 for operating the trough 5, the shaft being provided with a loose pulley 28, and a driving pulley 29 operated by belt in a well known manner, the usual belt shifting apparatus 30 being provided. The base of the trough 5 is provided on its underside and at two opposite ends with housings 31 for the upper ends of crankshafts 32 which are mounted in housings 33 secured to the framing 2. These crankshafts are provided at their lower ends with bevel wheels 34 meshing with an driven by bevel wheels 35 on the driving shaft 27 whereby the trough is operated and subjected to a circular or gyrating movement determined by the throw of the crankshafts 32 which may, for example, be three inches or any other suitable amount found to be convenient.

For raising the false bottom 6 a bracket 36 is attached to the free end thereof and connected to this bracket is a lift rod 37 operable by a hand lever 38 through the medium of a lever 39 keyed to a spindle 40 mounted in brackets 41 and 42 attached to the framing 2. The connection of the lift rod 37 to the lever 39 and bracket 36 is such as to allow for the play required owing to the circular shaking movement of the trough 5. The hand lever 38 is held by a trigger 43 operable therewith over a quadrant 45 secured to the framing.

In use, lithographic plates are secured in any suitable manner to the false bottom 6 of the trough 5 and spherical bodies, e. g., marbles, discharged on to the plates by operating the handwheel 23 so as to swing and tilt the container 18, water and a sprinkling of the required gritty substance being provided in the trough, the machine is then set in motion by manipulating the belt shifting apparatus so as to permit the driving shaft 27 to rotate and the bevel wheels 35 thereon rotate the engaging bevel wheels 34 which in turn operate the crankshafts 32 for actuating the trough 5. After the requisite time has elapsed for the plates to have become grained by the action of the spherical bodies and whilst the machine is still operating the flap 24 on the container 18 is dropped back and the drop front plate 9 is released by the hand lever 12 and lowered into a position in line with the false bottom 6 as indicated in dotted lines in Fig. 1, and the hand lever 38 is manipulated to raise the false bottom also as indicated in dotted lines in Fig. 1, whereupon the spherical bodies gradually fall into the container 18 by passing over the drop front plate 9 and the flap 24, the machine is then stopped and the plates removed and substituted by new ones for another operation. Meanwhile the spherical bodies can be washed before being returned to the trough and owing to the container 18 being mounted separately from the trough, the spherical bodies can be returned thereinto either before or after the trough has commenced to gyrate again. Preferably, however, they are returned whilst the trough is gyrating so that they operate upon the plates immediately and thereby avoid scratching them.

With a machine made according to this invention the trough can be operated at a greater speed and plates grained in less time than it usually takes at present, resulting in a sharper, deeper and cleaner quality of grain than hitherto.

Further, owing to the container 18 being hinged and normally at rest in the well, the marbles are quickly cleaned as they fall into the perforated container.

The false bottom 6 may be raised by any other suitable means than that illustrated, as for example, by hydraulic or other fluid pressure or by an arrangement of push-rods or traversing rods.

It is found that a machine made according to this invention can be run at a greater speed than machines as hitherto constructed and in consequence of such speed the resultant motion of the spherical bodies is that of a spinning motion as against a rolling motion hitherto, which results in a much more uniform and satisfactory graining being obtained.

What I claim and desire to secure by Letters Patent is:—

1. A machine for graining lithographic plates comprising a trough mounted on a framing and adapted to be subjected to a gyratory movement, a tiltable false bottom to the trough to which the plates are adapted to be secured, a container for the graining elements mounted on the framing extraneously of, and separately from the trough, means for mechanically moving the container bodily towards the trough into a tipping position with respect thereto whilst said trough gyrates for depositing the graining elements thereinto, means for retaining said elements in the trough, and means for tilting the false bottom towards the container whilst the trough is gyrating for returning the graining elements into said container.

2. A machine for graining lithographic plates comprising a trough mounted on a framing and adapted to be subjected to a gyratory movement, a tiltable false bottom to the trough to which the plates are adapted to be secured, a container for the graining elements mounted on the framing extraneously of and separately from the trough, means for mechanically moving the container bodily towards the trough into a tipping position with respect thereto whilst said trough gyrates for depositing the graining elements thereinto, means for retaining said elements in the trough, means for tilting the false bottom towards the container whilst the trough is gyrating for returning the graining elements into said container, and means on the container for directing the elements into the trough on discharge from the container and for receiving and directing them back again into the container on return from the trough.

3. A machine for graining lithographic plates comprising a trough mounted on a framing and adapted to be subjected to a gyratory movement, a tiltable false bottom to the trough to which the plates are adapted to be secured, a container for the graining elements mounted on the framing extraneously of and separately from the trough, means for mechanically moving the container bodily towards the trough into a tipping position with respect thereto whilst said trough gyrates for depositing the graining elements thereinto, means for retaining said elements in the trough, means for tilting the false bottom towards the container whilst the trough is gyrating for returning the graining elements into said container, and means on the container for directing the elements into the trough on discharge from the container and for receiving and directing them back again into the container on return from the trough, said means for retaining the elements in the trough also constituting means for directing the elements towards the container on tilting of the false bottom.

4. A machine for graining lithographic plates comprising a trough mounted on a framing and adapted to be subjected to a gyratory movement, a tiltable false bottom to the trough to which the plates are adapted to be secured, a container for the graining elements mounted on the framing extraneously of, and separately from the trough, means for mechanically moving the container bodily towards the trough into a tipping position with respect thereto whilst said trough gyrates for depositing the graining elements thereinto, means for retaining said elements in the trough, means for tilting the false bottom towards the container whilst the trough is gyrating for returning the graining elements into said container, and means on the container for directing the elements into the trough on discharge from the container and for receiving and directing them back again into the container on return from the trough, said means serving to retain the elements in the container on tipping of the latter and to be operable by gravitational movement of the elements for releasing them for discharge into the trough.

5. A machine for graining lithographic plates comprising a trough mounted on a framing and adapted to be subjected to a gyratory movement, a tiltable false bottom to the trough to which the plates are adapted to be secured, a container for the graining elements mounted on the framing extraneously and separately from the trough, means for mechanically moving the container bodily towards the trough into a tipping position with respect thereto whilst said trough gyrates for depositing the graining elements thereinto, means for retaining said elements in the trough, means for tilting the false bottom towards the container whilst the trough is gyrating for returning the graining elements into said container, and means on the container for directing the elements into the trough on discharge from the container and for receiving and directing them back again into the container on return from the trough, said means serving to retain the elements in the container on tipping of the latter and to be operable by gravitational movement of the elements for releasing them for discharge into the trough, and said means for retaining the elements in the trough also constituting means for directing the elements towards the container on tilting of the false bottom.

6. A machine for graining lithographic plates comprising a framing, a gyratory trough mounted on said framing, means of the framing for gyrating said trough, a tiltable false bottom to the trough for receiving the plates, a perforated container for graining elements mounted about the framing extraneously of and separately from the trough, means carried by the framing for mechanically moving the container bodily towards the trough into a tipping poosition with respect therto whilst said trough gyrates for depositing the graining elements thereinto, means also on the framing for tilting the false bottom towards the container whilst the trough gyrates for returning the graining elements into said container, means on the false bottom for retaining said elements in the trough, said means also constituting means for directing the elements towards the container on tilting of the false bottom, means on the container for retaining the elements therein on tipping of said container until operable by the elements for releasing them into the trough, said means also constituting means for directing said elements into the trough on discharge from the container and for receiving and directing them back again into the container on return from the trough.

CHARLES ARTHUR BECKETT.